United States Patent
Junk

(10) Patent No.: US 10,480,681 B2
(45) Date of Patent: Nov. 19, 2019

(54) PARTIAL STROKE TESTS FOR SHUTDOWN VALVES

(71) Applicant: FISHER CONTROLS INTERNATIONAL LLC, Marshalltown, IA (US)

(72) Inventor: Kenneth W. Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 209 days.

(21) Appl. No.: 15/387,272

(22) Filed: Dec. 21, 2016

(65) Prior Publication Data

US 2017/0184215 A1 Jun. 29, 2017

Related U.S. Application Data

(60) Provisional application No. 62/387,310, filed on Dec. 23, 2015.

(51) Int. Cl.
*F16K 37/00* (2006.01)
*F16K 31/122* (2006.01)
(Continued)

(52) U.S. Cl.
CPC ........ *F16K 37/0083* (2013.01); *F15B 15/066* (2013.01); *F15B 19/005* (2013.01); *F16K 31/1221* (2013.01); *F16K 31/1635* (2013.01)

(58) Field of Classification Search
CPC .................................................. F16K 37/0083
See application file for complete search history.

(56) References Cited

U.S. PATENT DOCUMENTS 7,079,021 B2 * 7/2006 Snowbarger ............. G05B 9/02
340/514
2002/0108436 A1 * 8/2002 Albuaijan ........... F16K 37/0083
73/168
(Continued)

FOREIGN PATENT DOCUMENTS

CN 102182864 A 9/2011
CN 102644798 A 8/2012
(Continued)

OTHER PUBLICATIONS

International Search Report and Written Opinion for PCT/US2016/068475, dated Mar. 21, 2017.
(Continued)

*Primary Examiner* — Manuel A Rivera Vargas
(74) *Attorney, Agent, or Firm* — Marshall, Gerstein & Borun LLP

(57) ABSTRACT

To generate a setpoint signal to stroke a valve during a partial-stroke test, a first target is determined for the setpoint signal based at least on a travel displacement threshold, the travel displacement threshold corresponding to a desired extent of travel of the valve during the partial-stroke test; the setpoint signal is ramped from an initial value to the first target, during a first time interval; subsequently to the first time interval, the setpoint signal is maintained at the first target during a second time interval; a second target is determined for the setpoint signal based at least on the initial value; and during a third time interval subsequent to the second interval, the setpoint signal is ramped from the first target to the second target in a direction opposite to the ramping of the setpoint signal during the first time interval.

13 Claims, 10 Drawing Sheets

(51) Int. Cl.
*F16K 31/163* (2006.01)
*F15B 15/06* (2006.01)
*F15B 19/00* (2006.01)

(56) References Cited

U.S. PATENT DOCUMENTS

2014/0180622 A1* 6/2014 Otsuka ............... G05B 19/0428
  702/113
2015/0323936 A1* 11/2015 Junk .................. F16K 37/0075
  700/282

FOREIGN PATENT DOCUMENTS

| CN | 104964088 A | 10/2015 |
| CN | 105135041 A | 12/2015 |

OTHER PUBLICATIONS

Office Action issued in Chinese Patent Application No. 201611207366.1, dated Aug. 1, 2019.

* cited by examiner

PARTIAL STROKE TESTS FOR SHUTDOWN VALVES

FIELD OF THE TECHNOLOGY

The present disclosure relates generally to valves and, more particularly, to running partial stroke tests of on/off valves.

BACKGROUND INFORMATION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Safety instrumented systems (SIS) typically incorporate emergency shutdown valves which are normally in a fully opened or a fully closed position. An emergency shutdown controller or a Programmable Logic Controller (PLC), for example, controls an emergency shutdown valve to change its operational state (e.g., from fully opened to fully closed) in the event of emergency. Because the purpose of a shutdown valve is to either allow full flow of fluid through a pipeline or completely shut off the flow of fluid, a typical shutdown valve has high friction seals, loose linkage, a large volume (to close off a pipe that can be several feet in diameter), a high preload (e.g., a large bias to keep the valve in a closed position), and a shallow bench set (i.e., lower and upper air signal pressures used to set the initial preloading of the actuator biasing element).

In contrast to emergency shutdown valves, control valves generally are used for throttling control, e.g., to set the amount of fluid flow within a certain range between a fully opened and a fully closed position. Designs of control valves generally are meant to minimize the error signal between setpoint and travel feedback, which can include minimizing friction, characterizing trim, designing tight linkages, having springs with large rates and small preloads, setting pressures near the ends of the spring range, etc.

To ensure that the emergency shutdown valves in a system will function properly when needed, process control system operators and/or process control software can periodically run partial-stroke tests during which these valves partially open or partially close. These tests are typically performed when an emergency shutdown valve is online in a live process. On the other hand, because control valves are not used for shutdown service, control valves rarely undergo partial-stroke tests.

Because of these difference in design considerations, simply applying positioning technology developed for throttling (control) valves to on/off (shutdown) valves during partial stroke testing has certain drawbacks. For example, venting an actuator of a shutdown valve from a hard stop takes considerable time and introduces significant travel deviation. Further, larger actuators yield larger error signals, which effectively requires that a partial-stroke test be run slower (whereas it is important to perform a partial-stroke test of a valve that is online quickly and reliably). Still further, transitions to hard cut-offs at the end of a test can yield pressure readings that indicate stuck valve conditions when the shutdown valve operates properly.

For at least these reasons, approaches to partial-stroke testing of valves known today either fail to yield accurate results when applied to shutdown valves (or, more generally, to on-off valves), or produce results that are of little value to supervision and maintenance of shutdown valves, or take too long to produce useful results.

SUMMARY

A valve controller or another suitable instrument executes a partial-stroke test of a shutdown valve by generating a setpoint signal suitable specifically for valves that normally are fully open or fully closed. This setpoint signal does not require that valve travel catch up to the setpoint, nor does this setpoint signal go into a hard cutoff upon reaching a predefined threshold. Further, the valve controller applies acceptance criteria that ensure that the shutdown valve moves to a minimum amount from the hard stop at some point during the test, and to abort the partial-stroke test if the shutdown valve reaches a maximum travel displacement threshold. Still further, the valve controller applies a certain set of acceptance criteria to data indicative of the relationship between actuator pressure and valve travel, so as to accurately determine the stuck valve condition. In other words, in at least some of the implementations discussed below, system dynamics are identified by looking strictly at input pressure and resulting travel.

One embodiment of these techniques is a method for executing partial-stroke tests of valves. The method comprises generating a setpoint signal to stroke a valve during a partial-stroke test, applying the setpoint signal to the valve, and determining whether the valve passes the partial-stroke test using a response to the setpoint signal. Generating the setpoint signal includes determining a first target for the setpoint signal based at least on a travel displacement threshold, the travel displacement threshold corresponding to a desired extent of travel of the valve during the partial-stroke test, where the first target corresponds to a larger extent of valve travel than the travel displacement threshold. Generating the setpoint signal further includes ramping the setpoint signal from an initial value to the first target, during a first time interval; subsequently to the first time interval, maintaining the setpoint signal at the first target during a second time interval; determining a second target for the setpoint signal based at least on the initial value; and during a third time interval subsequent to the second interval, ramping the setpoint signal from the first target to the second target in a direction opposite to the ramping of the setpoint signal during the first time interval.

Another embodiment of these techniques is a method for detecting a stuck valve condition during a partial-stroke test of a shutdown valve. The method includes receiving a signal indicative of actuator pressure when the valve travels between an end point and a displaced position from the end point, and determining whether the actuator pressure is within a set of acceptance criteria during the partial-stroke test. The criteria include (i) a minimum actuator pressure when the valve travels between the end point and the displaced position, (ii) a maximum actuator pressure when the valve travels between the displaced position and the end point, and (iii) a breakout pressure when the valve travels between a stop threshold position and a valve stop position, the breakout pressure corresponding to a force required to break out of a hard stop.

Yet another embodiment of these techniques is a system including a shutdown valve configured to operate in a fully open position or in a fully closed position, a position sensor to generate a position signal indicative of a current position of the shutdown valve, and a digital valve controller coupled to the shutdown valve and configured to execute a partial-stroke test of the shutdown valve. To execute the partial-stroke test, the digital valve controller is configured to determine a first target for a setpoint signal based at least on a travel displacement threshold, the travel displacement threshold corresponding to a desired extent of travel of the valve during the partial-stroke test, where the first target corresponds to a larger extent of valve travel than the travel displacement threshold; ramp the setpoint signal from an initial value to the first target, during a first time interval; subsequently to the first time interval, maintain the setpoint signal at the first target during a second time interval; determine a second target for the setpoint signal based at least on the initial value; during a third time interval subsequent to the second interval, ramp the setpoint signal from the first target to the second target in a direction opposite to the ramping of the setpoint signal during the first time interval; and monitor positioning of the shutdown valve in response to the setpoint signal using the position signal.

DETAILED DESCRIPTION

Generally speaking, the techniques of this disclosure allow an instrument to conduct an efficient and accurate partial-stroke test (PST) of an on-off valve such as an emergency shutdown valve. For clarity, an example system that includes a shutdown valve and a valve controller that tests the shutdown values in accordance with these techniques is briefly discussed with reference to FIG. 1, followed by a discussion of an example pneumatic setup for a shutdown valve as illustrated in FIG. 2. Example setpoint signals and parameter readings the are discussed with reference to FIGS. 3A-5, and example methods for executing a partial-stroke test and detecting a stuck valve condition are discussed with reference to FIGS. 6 and 7.

Example System and Pneumatic Actuator Setup

Figure 1:
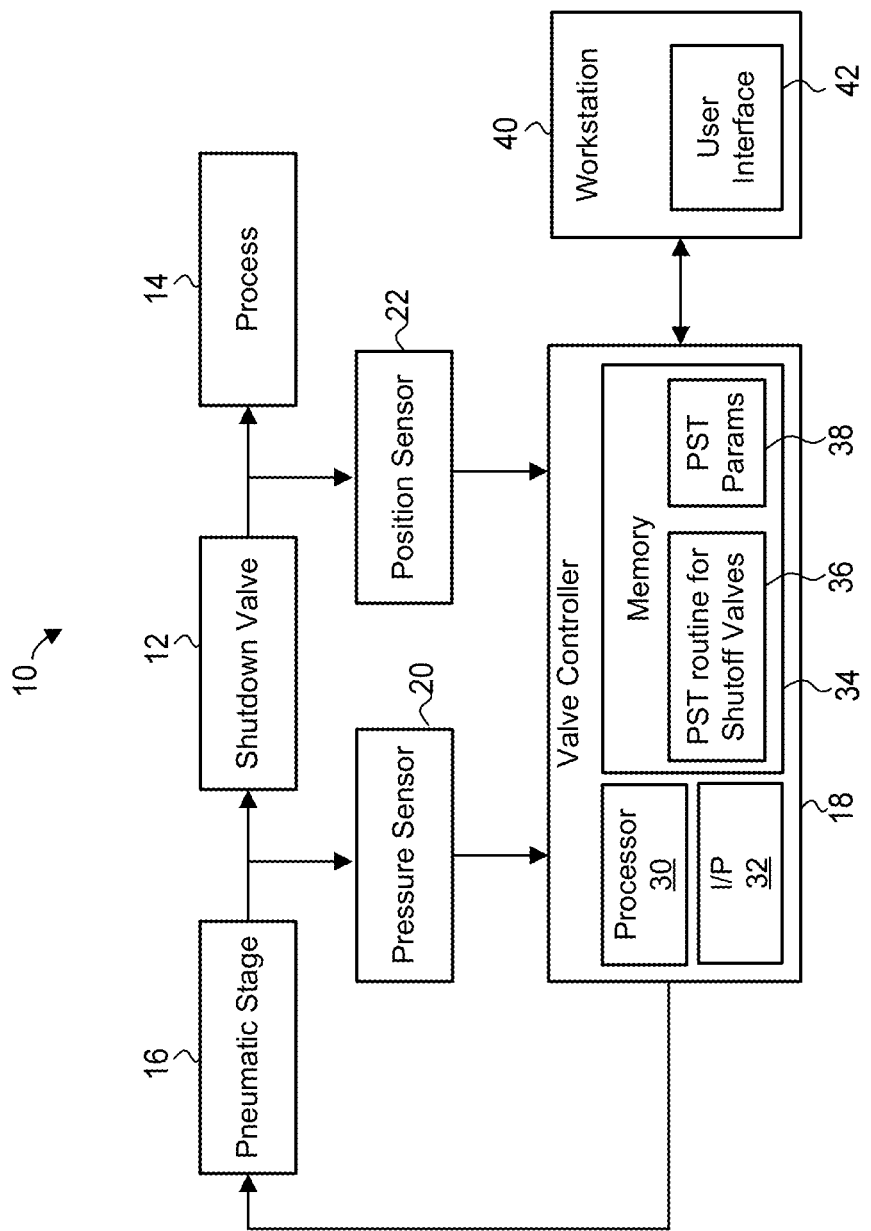
FIG. 1 is a block diagram of an example system in which a controller executes a partial-stroke test of a shutdown valve.
Figure 2:
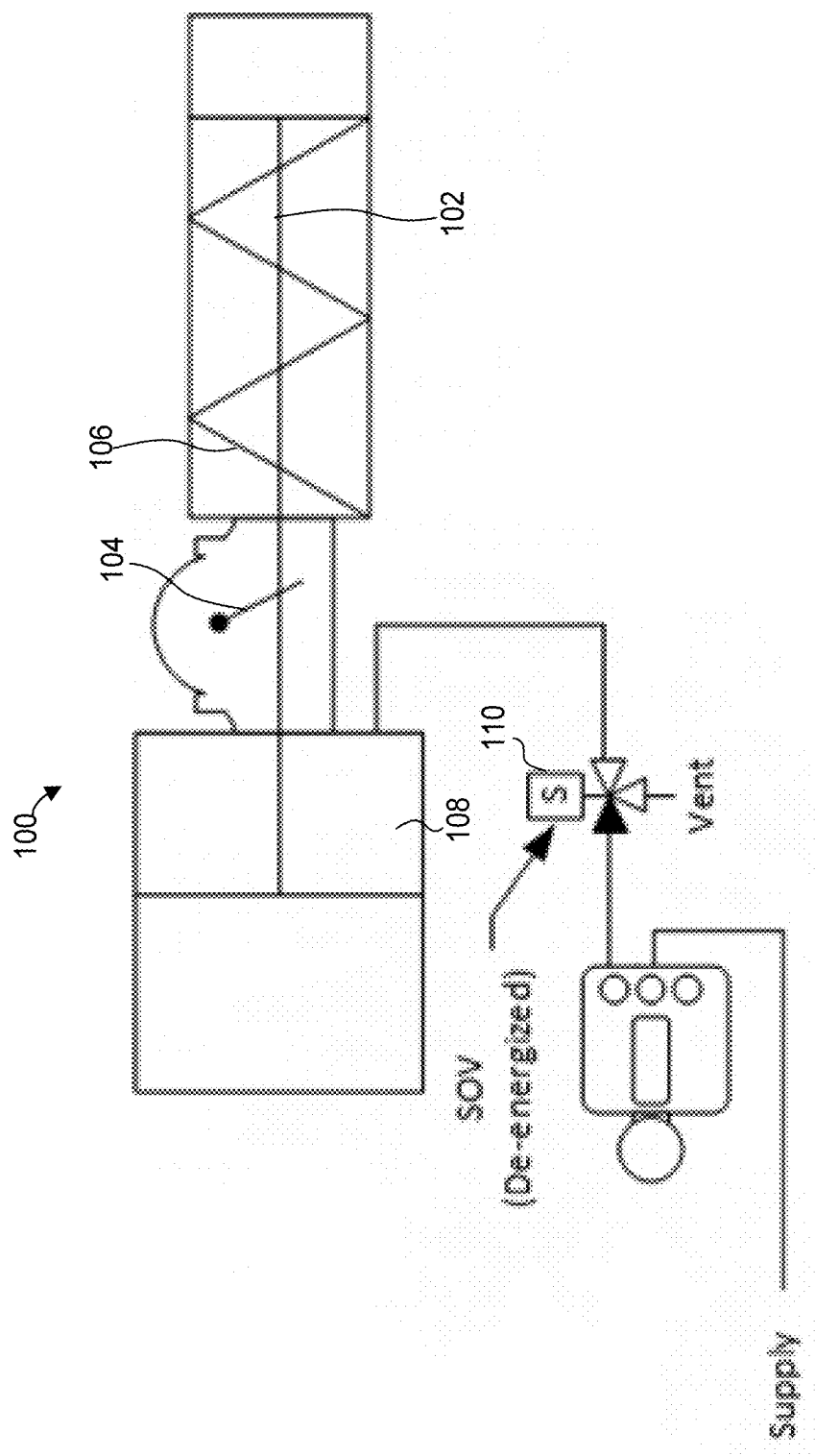
FIG. 2 is a block diagram illustrating an example pneumatic setup for an actuator of a shutdown valve that can operate in the system of FIG. 1.

Referring first to FIG. 1, an example system 10 includes a shutdown valve 12 configured to stop fluid flow in a process 14 in an event of emergency. A pneumatic stage 16 can include a pneumatic positioner and actuator or a pneumatic relay and/or an actuator. The pneumatic stage 16 generates a signal to position a moveable valve member (e.g., valve plug) of the shutdown valve 12 to thereby restrict or increase the flow of process fluid. An example actuator which can be used in the pneumatic stage 16 is further discussed below with reference to FIG. 2.

A digital valve controller 18 (or simply "valve controller 18") can control the shutdown valve 12 via the pneumatic stage 16. The valve controller 18 can receive signals indicative of actuator pressure and valve travel from a pressure sensor 20 and a position sensor 22, respectively. The sensors 20 and 22 can be implemented using any suitable components, including those currently known in the art.

As illustrated in FIG. 1, the valve controller 18 includes a processor 30, a current-to-pressure (I/P) converter 32, and a memory 34 storing a PST routine 36. The memory 34 can include a non-transitory medium readable by the processor 30, and the PST routine 36 can include instructions executable by the processor 30, in any suitable programming language. The memory 34 also can store PST parameters 38, such as ramp rate(s) for the setpoint signal, early turnaround selection, etc., as explained below.

A workstation 40 in this example configuration is coupled to the valve controller 34 to allow an operator to configure PST for the shutdown valve 12, activate PST, monitor test progress, etc. The workstation 40 includes one or more processors, a memory readable by the one or more processors, a network interface (none shown to avoid clutter), and a user interface 42 such as a touchscreen, a conventional screen with a keyboard, etc.

FIG. 2 illustrates an example pneumatic setup for an actuator 100, which can be used with the shutdown valve 12 of FIG. 1. More generally, however, the techniques of this disclosure are compatible with any type of an actuator to which a setpoint indicating a particular percentage of valve travel can be supplied, and in which at least a signal indicative of the current position of the throttling element can be measured.

In the actuator 100, a rod 102 is coupled to a valve plug or another suitable throttling element via a yoke 104. A rotatory position sensor 22 can be placed on the shaft of the actuator 100 to generate an electric signal indicative of valve travel. In other implementations, positions sensor can be coupled to actuators using other suitable techniques.

A spring 106 biases the actuator 100 toward a fully closed position. In other implementations, the spring 106 can be replaced with another biasing element. Pressure in a cylinder 108 prevents the spring 106 from driving the actuator 100 toward the fully closed position. Thus, the cylinder 108 is pressured during normal operation, when the shutdown valve on which the actuator 100 operates is inactive. Actuator pressure can be measured in the chamber 108. To this end, any suitable pressure sensor can be used.

In an emergency, or in response to another event that requires that the valve shut down the flow, a solenoid 110 is de-energized, causing the chamber 108 to depressurize, which in turn allows the spring 102 to drive the valve toward a closed state. When the solenoid 110 is energized, pressure is supplied to the chamber 108 to thereby reposition the valve. During a PST, the solenoid 110 usually is powered and stationary.

Example Setpoint Signals

Figure 3A:
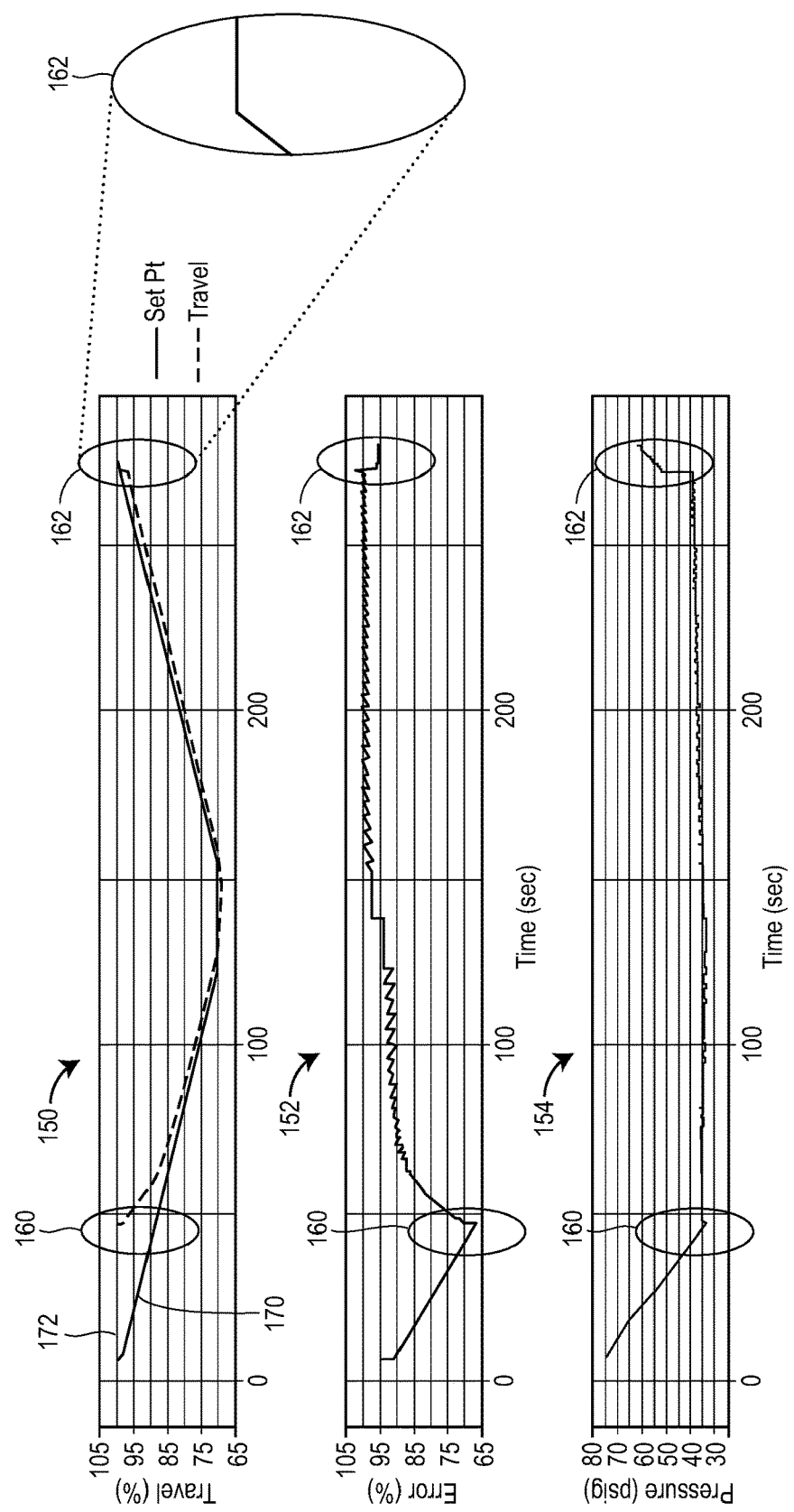
FIG. 3A is a set of graphs that illustrate changes in parameter values during a partial-stroke test of an example shutdown valve, carried out in a conventional manner.

Prior to the discussion of example setpoint signals generated in accordance with the techniques of this disclosure, a setpoint signal along with travel and pressure changes during a conventional PST of a shutdown valve are briefly considered in connection with FIG. 3A. The plots in FIG. 3A illustrate valve travel (plot 150), error percentage between setpoint and valve travel (plot 152), and actuator pressure (plot 154) as functions of time. These plots illustrate a typical response of a shutdown valve when the cylinder is depressurized. Generally speaking, the instrument in this scenario ramps a command (setpoint) signal to a given point, pauses so that valve travel can catch to the command signal, and then ramps the command signal back to the starting position. When the setpoint signal at a certain point levels off, the instrument lets valve travel to catch up. The instrument drives the pneumatics hard to full supply or full vent and, if travel lags setpoint, travel will snap into hard stop. This sudden change in pneumatics causes distortions in data at the stop, making interpretation of the results difficult.

In (approximate) region 160, the valve begins to move after an initial decrease in pressure. As best illustrated in plot 150, a setpoint signal 170 gradually changes while a valve travel signal 172 does not begin to change until a point in the region 160. As a result, the error grows to almost 12%, as seen in plot 152. Further, as seen in plot 154, actuator pressure continues to decrease until reaching region 160, where the pressure levels off.

If error is used as an indicator of whether the valve operates properly, the data illustrated in plot 152, and especially the data points in region 160, may be interpreted as a potential problem. However, the travel and pressure readings of FIG. 3A can correspond to normal operation of a shutdown valve assembly (i.e., a shutdown valve and an actuator) with a large volume, a shallow bench set, and high preload. In other words, whereas a 12% error may be a generally reliable indication that something is wrong with a conventional control valve, this error need not indicate failure for a shutdown value, particularly a large shutdown valve. Venting an actuator of a shutdown valve from a hard stop takes considerable time and introduces significant travel deviation, as indicated above. Thus, conducting a PST as illustrated in FIG. 3A can generate data that is misleading regarding the health of the shutdown valve.

A controller could minimize the error signal for large actuators by slowing down the test signal, so that the pneumatics have time to respond. However, this workaround only serves to prolong the test. These limitations are due to the error signal being the wrong variable for partial stroke testing, where typically it is desirable to determine whether friction is excessive and whether the valve fails to move. Error signal between reference and travel does not directly contain the necessary input variable to identify the system dynamics. Moreover, slowing down PSTs is inconsistent with another general objective, which is to complete a PST on a live shutdown valve quickly and with minimal disruption to the process.

Figure 3B:
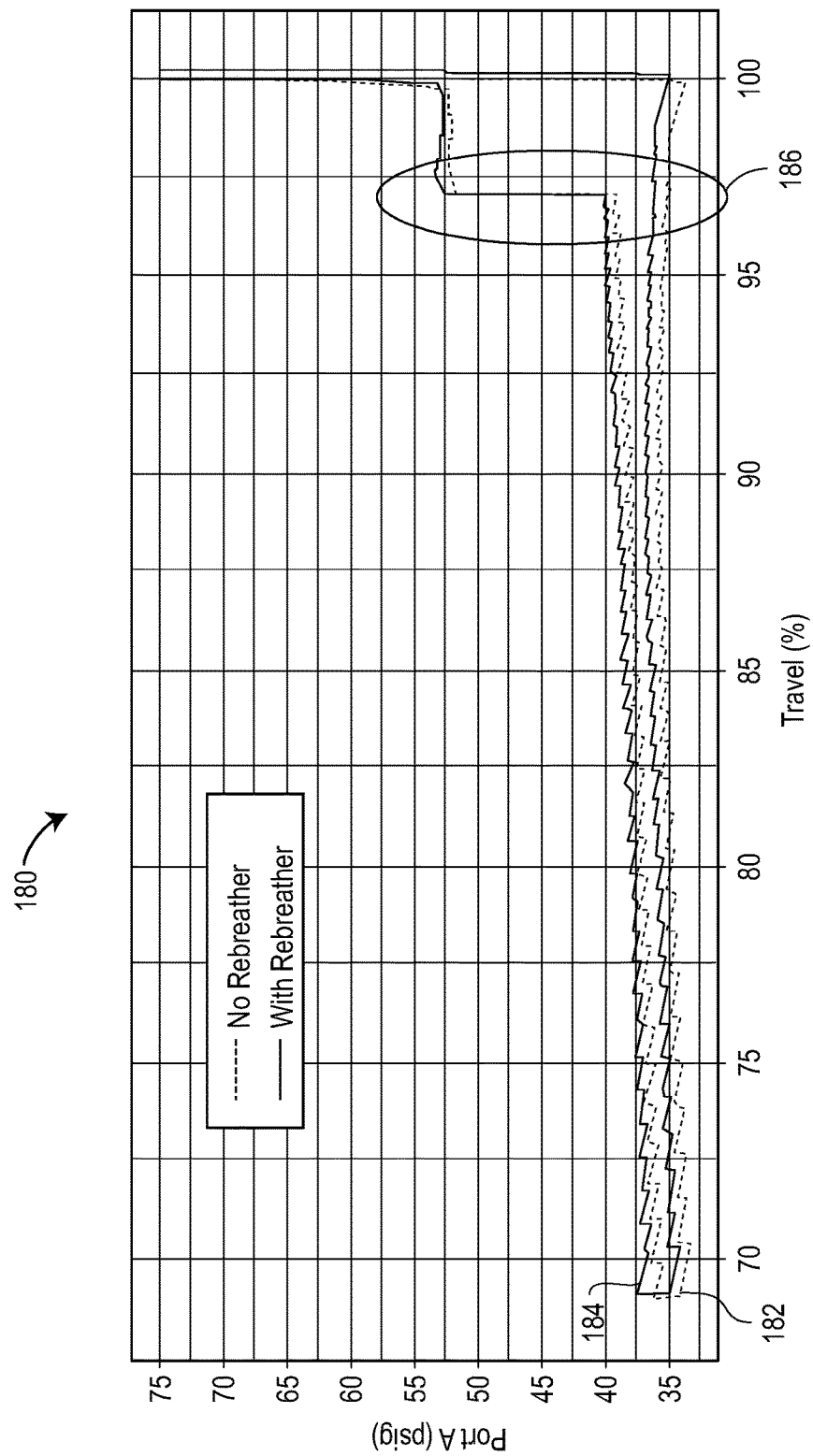
FIG. 3B is a plot of actuator pressure versus actuator travel for an example shutdown valve configured to operate at multiple partially open positions.

Further, region 162 in FIG. 3A illustrates that at the end of the PST, the transition to a hard cutoff can introduce anomalies in the pressure data due to line restrictions near the pressure sensor increasing the pressure response locally. As can be seen in plot 154, pressure appears to first climb from approximately 40 psig to 52 psig with no corresponding change in travel, and then rise gradually with the change in travel. Also, plot 180 in FIG. 3B illustrates changes in measured actuator pressure versus valve travel for two configurations of the same or similar shutdown valve. In particular, one of the configurations of the valve includes a rebreather (data points 184), and the other configuration does not include a rebreather (data points 182). For both configurations, the valve is repositioned between 100% and approximately 68%. In FIG. 3B, region 182 appears to show that there is no travel in response to a significant change in pressure between approximately 40 psig and 53 psig.

The discontinuities in regions 162 and 186 can be due to travel lagging the setpoint when a hard cutoff is engaged, causing flow to increase dramatically and pressure local to the sensor, rather the cylinder, to rise concomitantly. This data does not reflect what is happening in the cylinder and makes assessing stuck valve on the return stroke difficult. In particular, the data does not clearly convey whether the valve got stuck and then came loose, or whether the apparent discontinuities are an artifact of how the PST was executed.

Figure 4A:
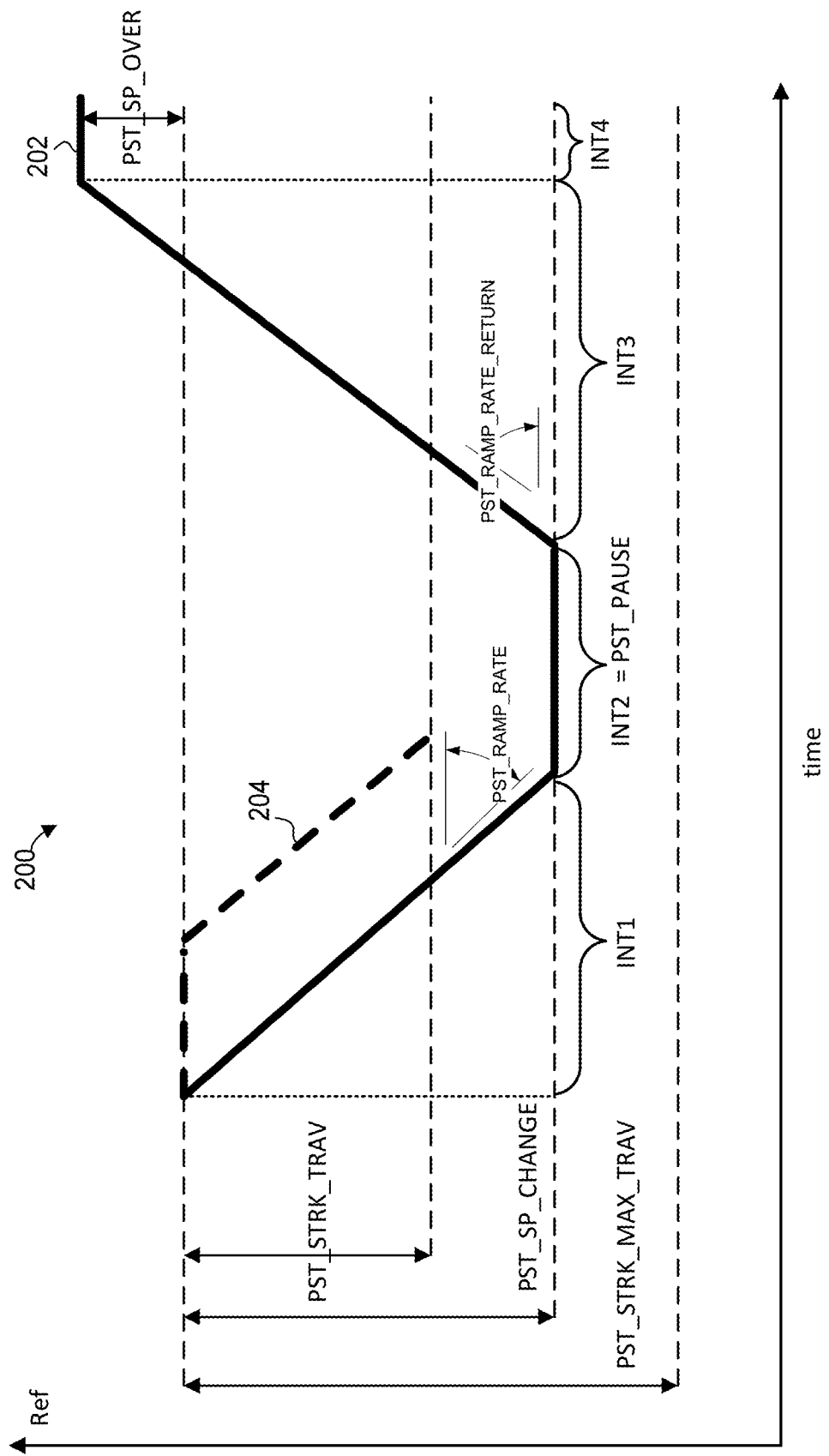
FIG. 4A is a plot of a nominal setpoint signal, which the controller of FIG. 1 is configured to generate to execute a partial-stroke test of a shutdown valve.

Now referring to FIG. 4A, plot 200 illustrates a nominal setpoint signal 202, which an instrument such as the valve controller 18 can apply to a shutdown valve to efficiently and accurately test the shutdown valve 12, without generating the ambiguities in data discussed with reference to FIGS. 3A and 3B. More generally, the setpoint 202 can be generated by any suitable instrument and applied to any suitable on-off valve.

To initiate the PST of FIG. 4A, an operator can specify the desired amount of travel for the shutdown valve 12 during a PST, as well as the desired rate(s) of change for the setpoint signal, via the user interface 42 of the workstation 40 (see FIG. 1). For example, the user may wish the shutdown valve to travel 30%, from the 100% open to 70% open position, at the rate of 1% per second on the stroke (as parameter PST_RAMP_RATE) and 2% per second on return (as parameter PST_RAMP_RATE_RETURN). In some implementations, the user can specify the same rate for both directions; however it may be desirable to stroke relatively slowly and return relatively quickly. The workstation 40 in turn can supply these parameters to the valve controller 18, to be used as PST parameters 38.

The desired amount of travel is illustrated as the minimum required travel or minimum travel displacement threshold PST_STRK_TRAV illustrated in FIG. 4A. Using the value of PST_STRK_TRAV, the valve controller 18 can calculate parameter PST_SP_CHANGE, which corresponds to the setpoint displacement from the hard stop. The PST_SP_CHANGE can be expressed as a percentage. In an example implementation, the valve controller 18 calculates PST_SP_CHANGE by multiplying PST_STRK_TRAV by a certain predetermined or preconfigured factor, such as 1.1, to define a 10% increase over PST_STRK_TRAV. More generally, the valve controller 18 can determine PST_SP_CHANGE by applying any suitable formula to PST_STRK_TRAV, but in any case PST_SP_CHANGE should define a larger value than PST_STRK_TRAV to compensate for calibration shifts, friction, or other offsets. It is noted that PST_SP_CHANGE does not define maximum travel displacement. Rather, this value defines one of the targets for the setpoint signal.

During the first interval INT1, the valve controller 18 ramps the signal 202 at the rate PST_RAMP_RATE from an initial position of the valve, e.g., the hard stop, to the first target PST_SP_CHANGE. In a typical situation, a travel signal 204 lags behind the setpoint 202, as illustrated in FIG. 4A.

After completing the ramp-up during the interval INT1, the nominal setpoint signal 202 remains constant during a next interval INT2. The duration of the interval INT2 can be controlled by a parameter PST_PAUSE. Depending on the implementation, PST_PAUSE can be fixed at a certain value, such as twice the dead time off the valve stop (i.e., twice the time it takes the valve to initially respond to the setpoint signal and begin to move). In one example implementation, the PST_PAUSE is twice the dead time with a minimum value of 20 seconds. Further, in some implementations, an operator can override the default or suggested value for PST_PAUSE.

With continued reference to FIG. 4A, the valve controller 18 can apply a maximum travel displacement threshold PST_STRK_MAX_TRAV as a secondary safety criterion. The value of PST_STRK_MAX_TRAV can be calculated using PST_STRK_TRAV, for example. As a more specific example, PST_STRK_MAX_TRAV can be set to 1.3*PST_STRK_TRAV. In general, however, the value of PST_STRK_MAX_TRAV need not be larger than PST_STRK_TRAV. If the valve travel signal 204 reaches PST_STRK_MAX_TRAV, the valve controller 18 can abort the PST. This may occur when there are calibration errors (e.g., when the I/P bias is off) or due to other abnormal conditions. The valve controller 18 can compare the travel signal 204 to PST_STRK_MAX_TRAV during all of the intervals of the PST, INT1 through INT4.

After the hold time between outgoing and return ramps during the interval INT2, the setpoint signal 202 begins to ramp in the return direction at the rate PST_RAMP_RATE RETURN during an interval INT3. The setpoint signal 202 in this example implementation ramps to a target that exceeds the hard stop position by PST_SP_OVER. The value of PST_SP_OVER can be preconfigured as a certain percentage, for example.

The valve controller 18 thus overdrives the servo and waits for the travel signal 204 to catch up during an interval INT4 before engaging a hard cutoff. The value of the interval INT4 can be set to PST_PAUSE or a different value, possibly including an operator-specified value, if desired.

In an example scenario, the valve controller 18 ramps the setpoint signal 202 from 100% to 80%, holds the setpoint signal 202 for 20 seconds, returns to 110%, holds the setpoint signal 202 for additional 20 seconds, and engages a hard cutoff.

Rather than using the error signal as an acceptance criterion in the manner discussed with reference to FIG. 3A, the valve controller 18 uses PST_STRK_TRAV and PST_STRK_MAX_TRAV as acceptance criteria. On return, the valve controller 18 compares the travel signal 204 to the initial position value (in this case, the hard stop) to determine whether the valve returned to its initial position. In this manner, the valve controller 18 can conduct PSTs more efficiently and check conformance of the shutdown valve more accurately.

Figure 4B:
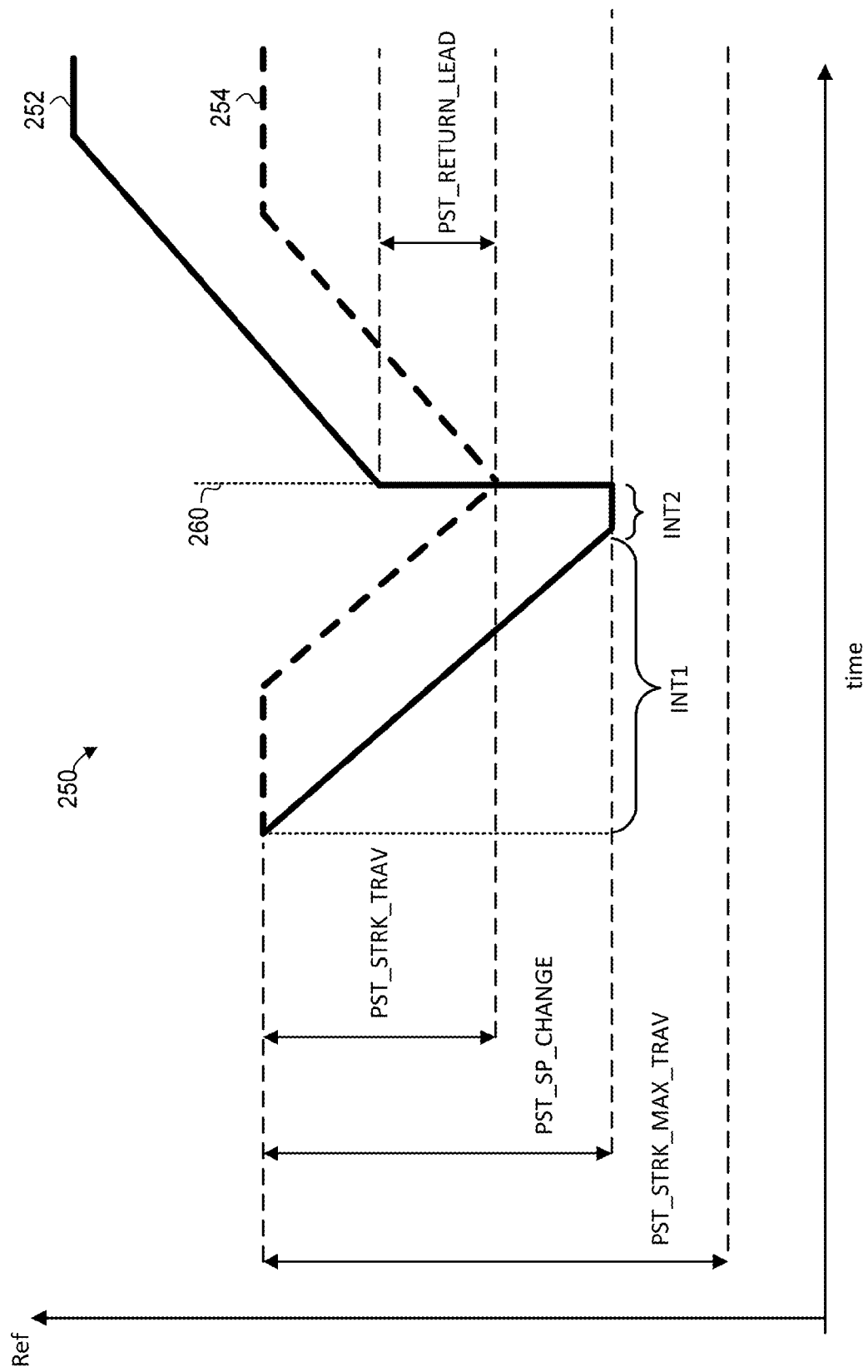
FIG. 4B is a plot of a setpoint signal with an early-return modification, which the controller of FIG. 1 is configured to generate to execute a partial-stroke test of a shutdown valve.
Figure 4C:
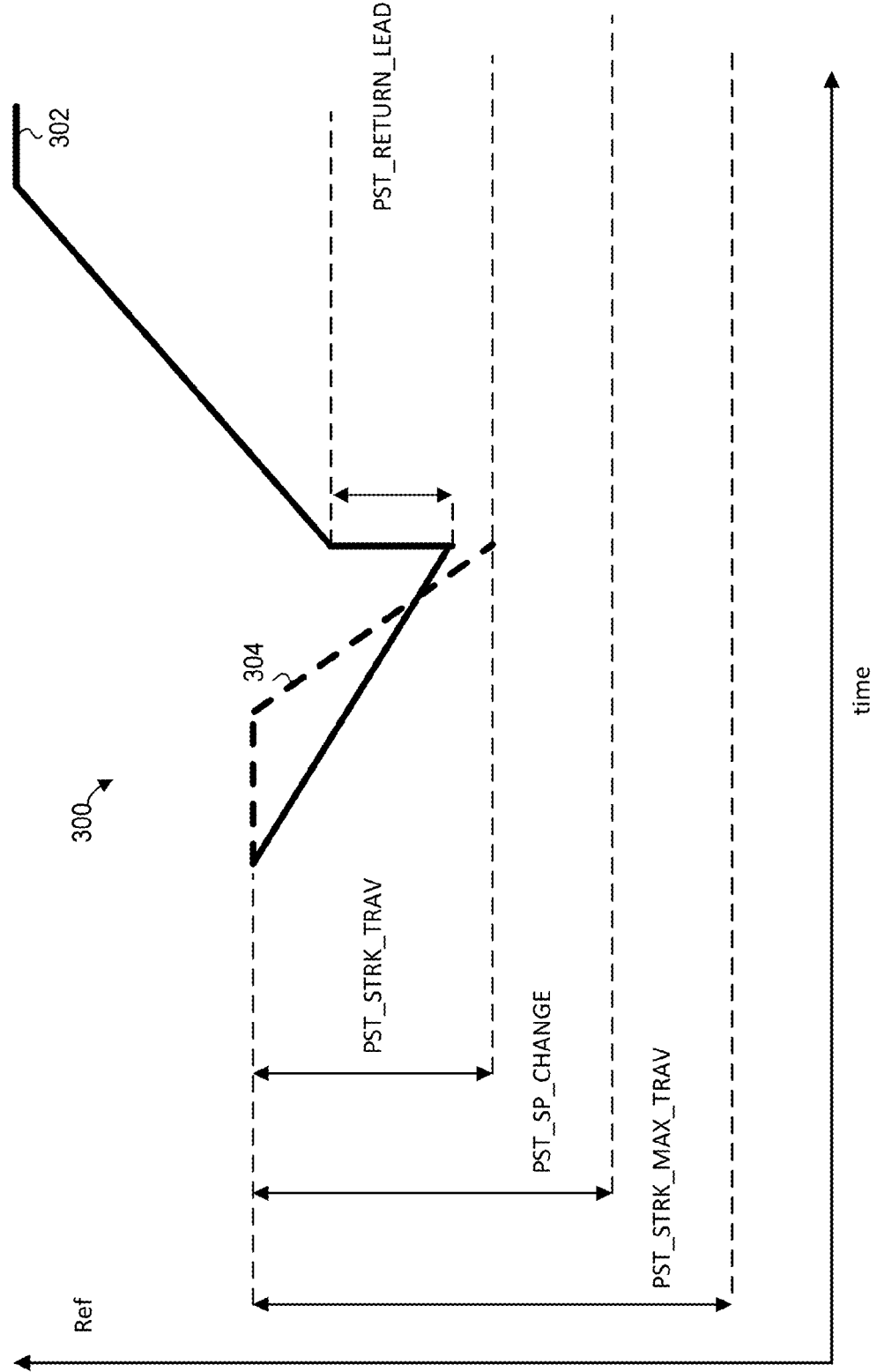
FIG. 4C is a plot of a setpoint signal with an early-return modification, where the valve position leads the setpoint signal, which the controller of FIG. 1 is configured to generate to execute a partial-stroke test of a shutdown valve.

Now referring to FIG. 4B, plot 250 illustrates application of a setpoint signal 252 to a shutdown valve, and the corresponding travel signal 254. The setpoint signal 252 is generally similar to the setpoint signal 252, except that here the operator has selected early-turnaround as one of the PST parameters. More particularly, in an example implementation, the operator specifies whether he or she wishes the setpoint signal to have the nominal profile illustrated in FIG. 4A, where the duration of interval INT2 is fixed at PST_PAUSE, or whether the duration of the interval INT2 should be limited by the time it takes the travel signal to reach PST_STRK_TRAV.

Plot 250 illustrates the scenario where the operator has enabled the early-turnaround feature, and the valve controller 18 modifies the setpoint signal 252 at a turnaround point 260, in response to receiving an indication from the travel sensor that the travel signal 254 reached PST_STRK_TRAV. Accordingly, the setpoint signal 252 begins to ramp at point 260 rather than staying at PST_SP_CHANGE. Similar to the setpoint signal 202, the setpoint signal 252 can ramp beyond the hard stop to overdrive the servo, so that the travel signal 254 can catch up without slowing down near the end of the test.

Generally speaking, the early-turnaround capability allows the valve controller 18 to minimize the total test time and minimize process changes. For example, for a certain large shutdown valve, the total test time was reduced from approximately 240 seconds to approximately 150 seconds. The early-turnaround feature may be particularly useful when used with large actuators that tend to be slower.

When early turnaround is enabled, the valve controller 18 can redefine the initial conditions for the return setpoint as the actual travel or current setpoint, whichever is closer to the hard stop. Moreover, because the travel signal 254 often lags the setpoint signal 252, the valve controller 18 can add a "lead" value, PST_RETURN_LEAD, to the setpoint signal 252 at the early-turnaround point 260. This lead value causes valve travel to reverse immediately or almost immediately.

For example, if the nominal setpoint signal that runs 100% to 70% with a minimum travel threshold PST_STRK_TRAV set at 80%, the valve controller 18 can initialize the return setpoint at the greater of the current value of the setpoint signal or the current value of the travel signal. If the setpoint signal is below the travel signal when PST_STRK_TRAV is reached (as is the usual case), the valve controller 18 initializes the return setpoint to 80%, according to the nominal profile of the setpoint signal. However, because the travel signal lags the setpoint signal, setting the return setpoint at the level of the current travel signal will cause the shutdown valve to drift beyond this threshold. To solve this problem, the valve controller 18 can set the initial conditions for the return setpoint to 80% plus PST_RETURN_LEAD, such as 5%, so that the total initial condition for the return setpoint would be 85%.

FIG. 4B illustrates the (more common) scenario where the travel signal 254 lags the travel setpoint 252 at the turnaround point 260. Early turnaround is enabled, and the valve controller 18 immediately brings the setpoint up to PST_RETURN_LEAD and adds PST_STRK_TRAV to begin ramping the travel signal 254 in the return direction from this point. In other words, the valve controller 18 instantaneously modifies the setpoint by (PST_SP_CHANGE−PST_STRK_TRAV)+PST_RETURN_LEAD. On the other hand, in the plot of FIG. 4C, a setpoint signal 302 lags a travel signal 304. Accordingly, the valve controller 18 in this case adds PST_RETURN_LEAD to the current value of the setpoint signal 302, thereby instantaneously modifying the setpoint by only PST_RETURN_LEAD.

Example Pressure Analysis

Figure 5:
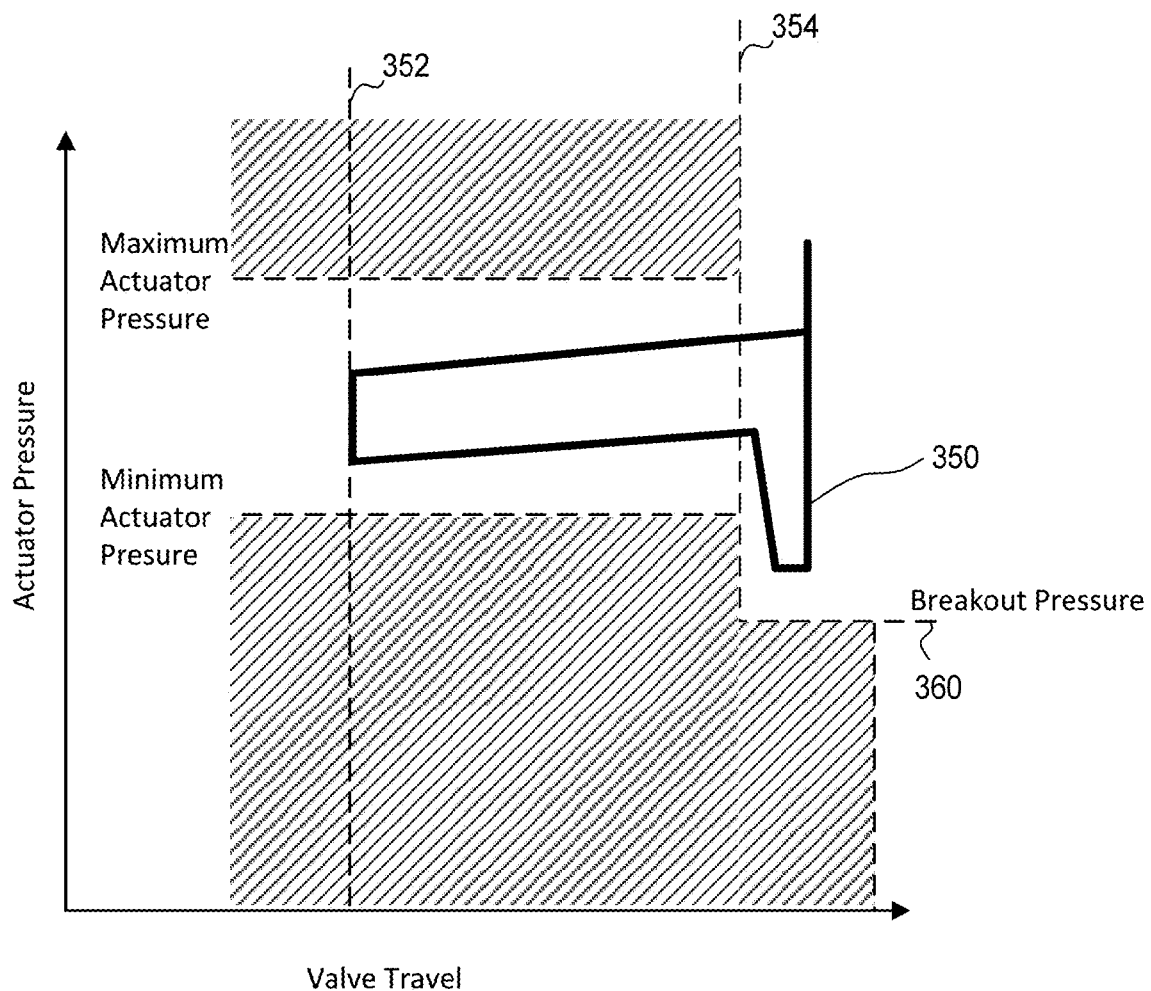
FIG. 5 is a plot that illustrates acceptance criteria applied to a pressure-versus-travel plot generated during a partial-stroke test, which the controller of FIG. 1 can use to detect a stuck valve condition for a shutdown valve.

Next, FIG. 5 illustrates an example pressure-versus-travel plot 350 generated during a PST of a shutdown valve in accordance with the techniques discussed above with reference to FIGS. 4A-C. Similar to the pressure-versus-travel plot of FIG. 3B, the points that make up the plot 350 correspond to measurements of the actuator pressure at different percentages of valve travel, in both directions. Accordingly, the plot 250 can contain two points with different actuator pressures for the same valve travel percentage: one point corresponding to the movement in the direction of the fully closed position, and the other point corresponding to the movement in the direction of the fully open position.

To detect a stuck valve condition or another abnormal condition, the valve controller 18 can apply the following acceptance criteria: for valve travel between a partially open position 352 (which normally corresponds to PST_STRK_TRAV) and a stop threshold 354, the valve controller 18 determines whether the actuator pressure is between two fixed values, minimum actuator pressure and maximum actuator pressure. However, to account for forces required to break out of the hard stop, which may be larger than running force, the valve controller 18 determines the stop threshold 354 as a percentage of valve travel (e.g., 5%), and defines more permissive criteria for this region.

As illustrated in FIG. 5, the valve controller 18 determines whether actuator pressure is larger than breakout pressure 360, and does not impose an upper limit on actuator pressure in the region between the stop threshold 354 and the hard stop. Thus, the valve controller 18 accounts for expected high actuator pressures in this region and does not signal failure when processing the data points illustrated as the plot 350, as these data points actually describe normal behavior of a shutdown valve. In FIG. 5, regions corresponding to potential problems are shaded, and regions in which a pressure-travel data point can be located without triggering an alert are left un-shaded.

Referring back to FIG. 1, application of the acceptance criteria illustrated in FIG. 5 also can be implemented in the workstation 40 as part of a post-processing stage. More generally, the valve controller 18 can record actuator pressure and valve travel measurements in any suitable storage, including cloud storage, and an authorized user can access this data locally or remotely, using a dedicated workstation or a general-purpose computer.

Example Methods

For further clarity, example methods that can be implemented in the valve controller 18, the workstation 40, or another suitable computing device are discussed next with reference to FIGS. 6 and 7. The methods of FIGS. 6 and 7 can be implemented as sets of instructions in any one or several suitable programming languages and stored on a computer-readable medium.

Figure 6:
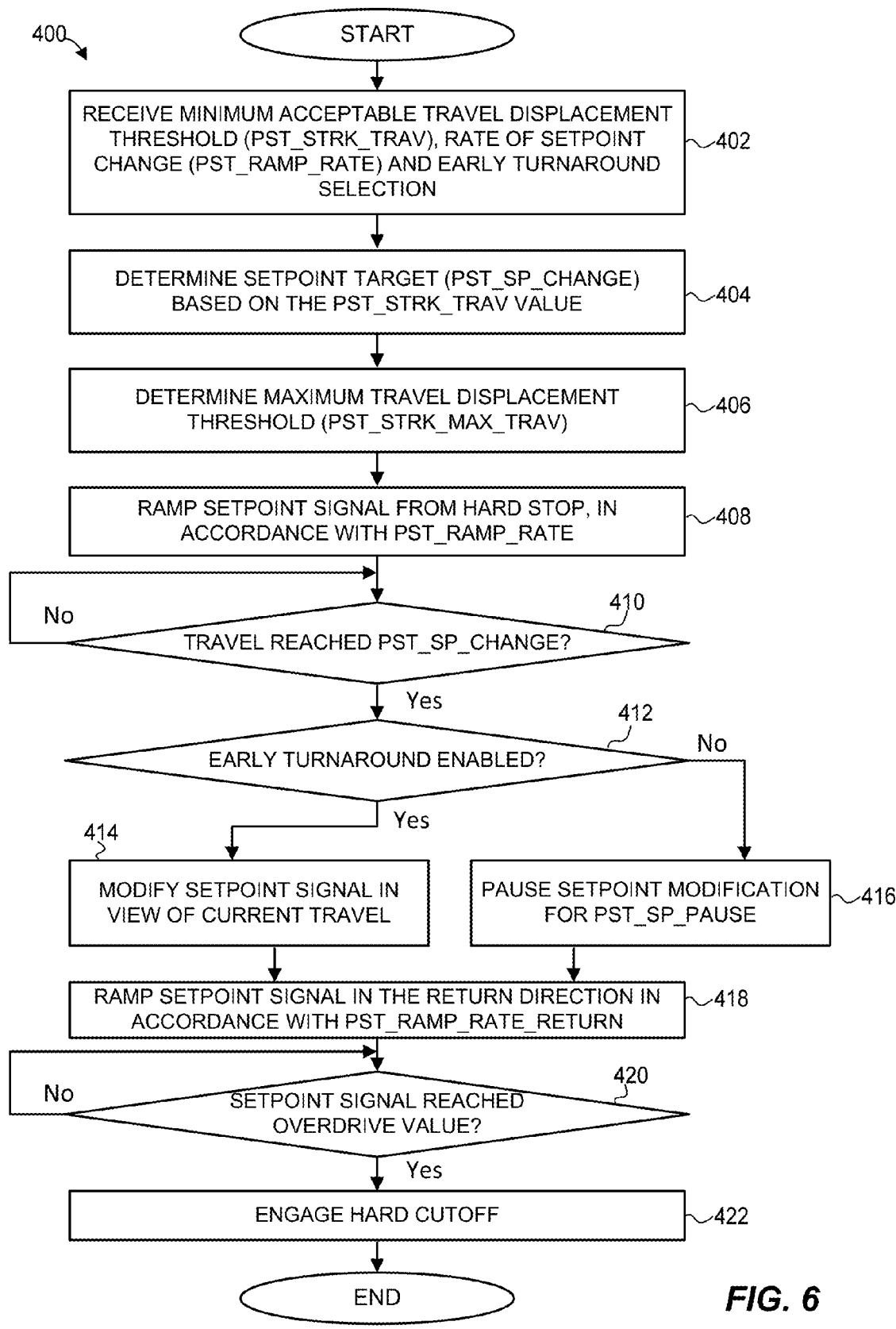
FIG. 6 is a flow diagram of an example method for generating a setpoint signal for a partial-stroke test of a shutdown valve, which can be implemented in the system of FIG. 1.

Referring first to FIG. 6, a method 400 for generating a setpoint signal for a partial-stroke test of a shutdown valve begins at block 402, where a minimum acceptable travel displacement threshold, PST_STRK_TRAV, is received along with the rate(s) of change of the setpoint signal in one or both directions (PST_RAMP_RATE, PST_RAMP_RATE_RETURN) and the early turnaround selection (YES/NO). Depending on the implementation, these parameters can be received from an operator, from a configuration file, or from an automated task.

At block 404, the first setpoint target, PST_SP_CHANGE is determined based on the value of PST_STRK_TRAV, by multiplying this value by a certain factor, adding a predefined value, or in another suitable manner. The maximum travel displacement threshold, PST_STRK_MAX_TRAV, is determined in a generally similar manner at block 406.

Next, the setpoint signal is ramped from the initial position toward the first target in accordance with the specified rate. If it is determined at block 410 that valve travel has reached PST_SP_CHANGE, the flow proceeds to block 412, where the early turnaround selection is checked. If early turnaround has not been enabled, the setpoint remains at the first target value for PST_SP_PAUSE number of seconds. Otherwise, if early turnaround has been enabled, the flow proceeds to block 414, where the setpoint signal is modified in view of the current travel signal. In particular, as discussed above with reference to FIGS. 4B and 4C, the valve controller 18 can check whether the setpoint signal is ahead of the travel signal, or whether the travel signal got ahead of the setpoint signal, and make an instantaneous adjustment to the setpoint accordingly.

Next, at block 418, the setpoint is ramped in the return direction in accordance with PST_RAMP_RATE_RETURN, toward a second target that can correspond to the initial value augmented by an overdrive value (e.g., PST_SP_OVER). Once the setpoint signal reaches the second target, hard cutoff is engaged at block 422. Additionally or alternatively, valve position can be monitored so that when the travel signal reaches the hard stop, hard cutoff is applied to the setpoint signal.

Figure 7:
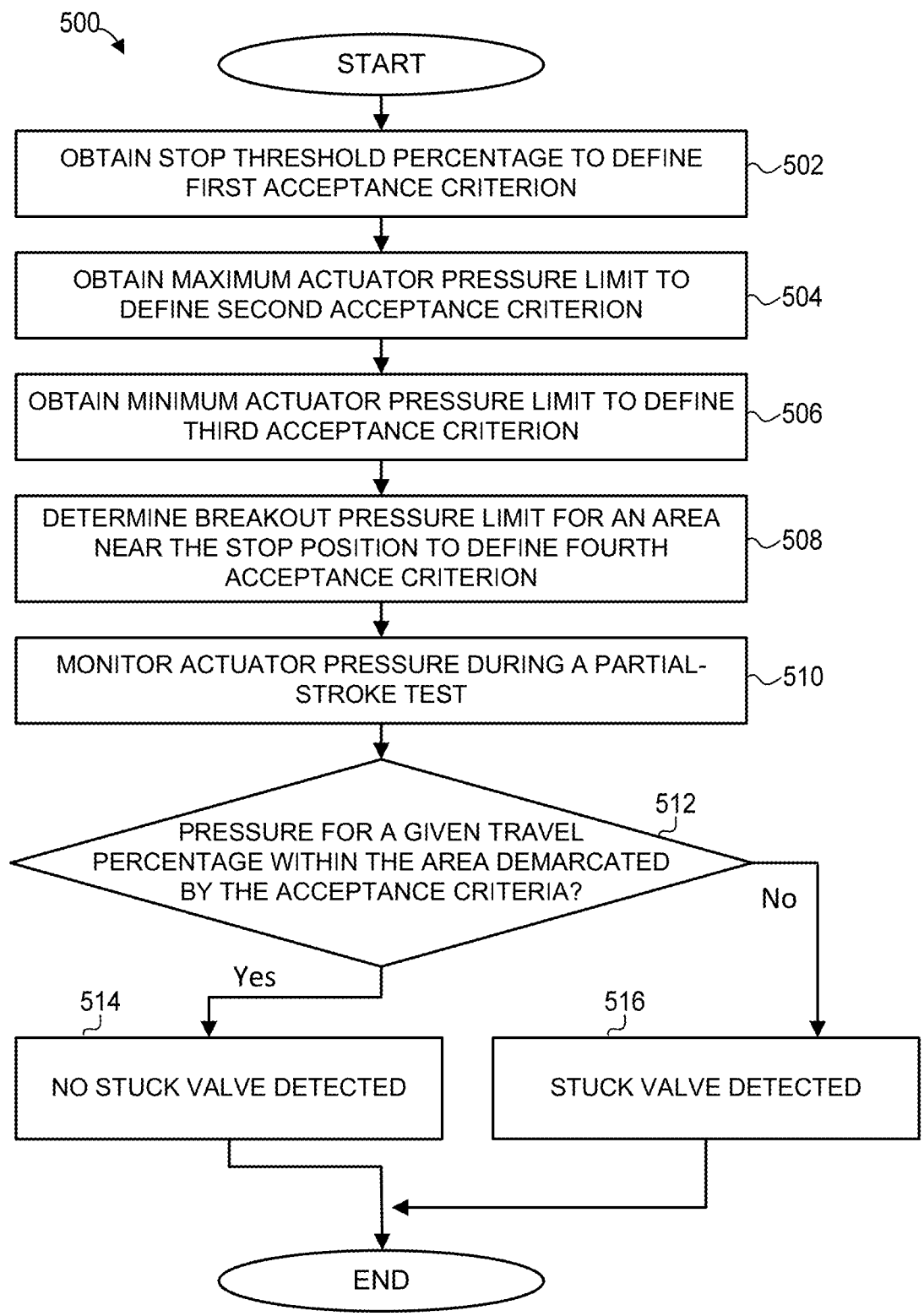
FIG. 7 is a flow diagram of an example method for detecting a stuck valve condition, which can be implemented in the system of FIG. 1.

FIG. 7 is a flow diagram of an example method 500 for detecting a stuck valve condition of a shutdown valve. The method 500 begins by collecting acceptance criteria for application to actuator pressure/valve travel data points. As used herein, the term "acceptance criterion" can refer to a factor applied to a data point to determine whether the data point is within an acceptable range.

More particularly, a stop threshold percentage is received from a preconfigured constant or an operator, for example, at block 502. Next, maximum and minimum actuator pressures are received at blocks 504 and 506, respectively. A breakout pressure limit is determined for an area near the stop position to define another acceptance criterion, as illustrated in FIG. 5.

Actuator pressure and valve travel are monitored during a PST at block 510 to collect a set of data points. Alternatively, a set of data points is received from a database or another storage device when the method 500 is executed as part of post-processing. The acceptance criteria collected at blocks 502-508 are applied to data points to determine whether any of the points exceed the acceptance criteria in terms of actuator pressure, valve travel, or both. Accordingly, the flow proceeds to block 514 when the data points indicate normal behavior or to block 516 when the data points indicate a potential problem. At block 516, an alert can be generated or operator(s) may be otherwise notified. If the stuck-valve condition is detected at block 516, the test is aborted, and the setpoint signal can ramp back or step back to the hard stop.

General Remarks

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the techniques of this disclosure have been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for executing partial-stroke tests of valves, the method comprising:
   generating a setpoint signal to stroke a valve during a partial-stroke test, including:
   determining a first target for the setpoint signal based at least on a travel displacement threshold, the travel displacement threshold corresponding to a desired extent of travel of the valve during the partial-stroke test, wherein the first target corresponds to a larger extent of valve travel than the travel displacement threshold,
   ramping the setpoint signal from an initial value to the first target, during a first time interval,
   subsequently to the first time interval, maintaining the setpoint signal at the first target during a second time interval,
   determining a second target for the setpoint signal based at least on the initial value, and
   during a third time interval subsequent to the second interval, ramping the setpoint signal from the first target to the second target in a direction opposite to the ramping of the setpoint signal during the first time interval;
   applying the setpoint signal to the valve; and
   determining whether the valve passes the partial-stroke test using a response to the setpoint signal.

2. The method of claim 1, wherein generating the setpoint signal includes maintaining the setpoint signal at the first target during the second time interval for a predetermined fixed amount of time.

3. The method of claim 1, wherein determining whether the valve passes the partial-stroke test includes:
   receiving an indication of current valve position during execution of the partial-stroke test, and
   comparing the current valve position to an acceptance criterion, wherein the acceptance criterion corresponds to the desired extent of travel of the valve.

4. The method of claim 3, wherein generating the setpoint signal further includes:
   transitioning from the second interval to the third time interval in response to determining that the current valve position reached the travel displacement threshold.

5. The method of claim 4, wherein transitioning from the second interval to the third time interval includes modifying the setpoint by a predetermined factor prior to ramping the setpoint signal during the third interval.

6. The method of claim 5, wherein modifying the setpoint by the predetermined factor includes:
   adding the predetermined factor to a current value of the setpoint signal if the current valve position lags behind the setpoint signal, or
   adding the predetermined factor to a current value of the of current valve position if the current valve position leads the setpoint signal.

7. The method of claim 3, further comprising:
   comparing the current valve position to an abort criterion that corresponds to a maximum allowable extent of travel of the valve; and
   in response to determining that the current valve position exceeds the abort criterion, aborting the partial-stroke test.

8. The method of claim 1, wherein determining the first target for the setpoint signal includes applying a predetermined factor to the travel displacement threshold.

9. The method of claim 1, wherein:
   the initial value and the first target differ by a first amount,
   the first target and the second target differ by a second amount, and
   the method includes determining the second target for the setpoint signal so that the second amount is larger than the first amount, to thereby overdrive the setpoint signal during the third interval.

10. The method of claim 1, wherein generating the setpoint signal to stroke a valve during a partial-stroke test further includes cutting off the setpoint signal after the setpoint signal reaches the second target.

11. The method of claim 1, further comprising receiving, via an operator interface, a selection of the desired extent of travel of the valve during the partial-stroke test.

12. The method of claim 1, further comprising:
   receiving, via an operator interface, an indication of a rate of change for the setpoint signal;
   wherein ramping the setpoint signal includes ramping the setpoint signal at the indicated rate.

13. The method of claim 1, further comprising:
   receiving, via an operator interface, an indication of a first rate of change for the setpoint signal and a second rate of change for the setpoint signal different from the first indicated rate,
   wherein:
   ramping the setpoint signal during the first time interval includes ramping the setpoint signal at the first indicated rate, and
   ramping the setpoint signal during the third time interval includes ramping the setpoint signal at the second indicated rate.

* * * * *

UNITED STATES PATENT AND TRADEMARK OFFICE
CERTIFICATE OF CORRECTION

| | | |
|---|---|---|
| PATENT NO. | : 10,480,681 B2 | |
| APPLICATION NO. | : 15/387272 | |
| DATED | : November 19, 2019 | |
| INVENTOR(S) | : Kenneth W. Junk | |

It is certified that error appears in the above-identified patent and that said Letters Patent is hereby corrected as shown below:

In the Drawings

At Fig. 5, Sheet 8 of 10, "Presure" should be -- Pressure --.

In the Specification

At Column 1, Line 19, "(SIS)" should be -- (SISs) --.

At Column 1, Line 52, "difference" should be -- differences --.

At Column 3, Line 67, "the are" should be -- are --.

At Column 4, Line 33, "valve controller 34" should be -- valve controller 18 --.

At Column 4, Line 66, "spring 102" should be -- spring 106 --.

At Column 5, Line 40, "indication" should be -- indicator --.

At Column 6, Line 6, "182)." should be -- 184). --.

At Column 6, Line 15, "rather the" should be -- rather than the --.

At Column 7, Line 6, "off" should be -- of --.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*